United States Patent

Terao et al.

Patent Number: 5,559,916
Date of Patent: Sep. 24, 1996

[54] METHOD FOR MANUFACTURING OPTICAL FIBER ASSEMBLY WITH POLISHED END-FACE, AN END FACE POLISHING APPARATUS, AND A METHOD FOR EXAMINING THE END POINT OF END-FACE POLISHING PROCESS OF OPTICAL FIBER

[75] Inventors: Kazuhiko Terao; Hidetoku Iida; Takeyasu Nakayama; Toshiya Kubo; Jiro Horigome, all of Nagano; Yoshihiro Matsuoka, Chiba; Nobutoshi Takeda, Chiba; Tohru Mizuhashi, Chiba, all of Japan

[73] Assignees: Totoku Electric Co., Ltd.; Emit Seiko Co., Ltd., both of Tokyo, Japan

[21] Appl. No.: 352,258

[22] Filed: Dec. 8, 1994

[30] Foreign Application Priority Data

Dec. 10, 1993 [JP] Japan .................................. 5-310265

[51] Int. Cl.⁶ ............................. G02B 6/00; G02B 6/36
[52] U.S. Cl. .................. 385/85; 385/147; 385/78
[58] Field of Search ......................... 385/60, 61, 72, 385/78, 79, 85, 147

[56] References Cited

U.S. PATENT DOCUMENTS

| | | | |
|---|---|---|---|
| 4,787,698 | 11/1988 | Lyons et al. | 385/85 |
| 5,245,684 | 9/1993 | Terao et al. | 385/85 |
| 5,461,689 | 10/1995 | Matsuoka et al. | 385/85 |

FOREIGN PATENT DOCUMENTS 0121805   5/1989   Japan .................................... 385/61

*Primary Examiner*—John Ngo
*Attorney, Agent, or Firm*—Jordan and Hamburg

[57] ABSTRACT

The end face of an optical fiber assembly consisting of an optical fiber s and a ferrule f is polished to form a conical surface with oblique faces Fp1 and Fp2 such that, central axis Ap of the conical surface makes an inclination of 8° with respect to the optical axis L of the optical fiber s, top Ft of the conical surface coincides with the optical axis L of the optical fiber s, and has a taper angle of 2°. Thereafter, the optical fiber assembly is further polished to form an oblique convex spherical surface at the end face such that, the central axis of the oblique convex spherical surface makes an inclination of 8° with respect to the optical axis L of the optical fiber s. Due to this, insertion loss and light reflected back to the source is stabilized and minimized.

11 Claims, 14 Drawing Sheets

5,559,916

METHOD FOR MANUFACTURING OPTICAL FIBER ASSEMBLY WITH POLISHED END-FACE, AN END FACE POLISHING APPARATUS, AND A METHOD FOR EXAMINING THE END POINT OF END-FACE POLISHING PROCESS OF OPTICAL FIBER

BACKGROUND OF THE INVENTION

1. Field of the Invention

The present invention relates to a method for manufacturing a optical fiber assembly with a polished end face, an end face polishing apparatus and a method for examining the end point of an end-face polishing process of the optical fiber. It also relates particularly to a method for manufacturing a optical fiber assembly with a polished end face, an end face polishing apparatus and a method for examining the end point of an end-face polishing process of the optical fiber for improving the connection characteristics of optical fibers in assemblies of the sort used in analog image communications like CATV (CAble TeleVision), very high speed communications and optical amplifiers, or optical fiber assemblies having isolator functions.

2. Description of the Prior Art

The prior art for connecting two optical fibers with a small connection loss and little light reflected back to the source has been proposed in U.S. Pat. No. 5245684 and Laid-open Japanese Patent Application Nos. 87111/1986 and 121805/1989. The objective is achieved by polishing the ferrule tips of both the fibers to an oblique convex spherical surface and connecting said fibers by bringing these oblique convex spherical surfaces in contact with each other.

For example, referring to FIG. 16, to connect the optical fibers s and s', the end faces of the ferrules f and f' of these optical fibers are polished to form oblique spherical surfaces q and q' in such a way that, the line joining the centers of curvature C and C' of the said oblique spherical surfaces q and q' makes an angle of 8° with respect to the optical axes L and L' of said optical fibers.

The foregoing method improves the coincidence of the optical axes of the fibers s and s' and enables light reflected back to the source to be minimized.

In conventional optical connector end-face polishing methods, the convex spherical surface q is formed according to the procedure mentioned below.

In the beginning, as shown in FIG. 17(a), the optical fiber s and the ferrule f with a cortically tapered tip are bonded by reinforced adhesives.

Next, as shown in FIG. 17(b), the ferrule f is rotated around a vertical axis of rotation after inclining it by an angle of 8° on a polishing disc (not shown in the figure), thereby forming an oblique horizontal surface F at the tip of the ferrule f. Because the ferrule f has a conically tapered tip, the center Ft of the oblique horizontal surface F is offset from the point P where the optical axis of the optical fiber s intersects with the surface F.

Hereafter, as shown in FIG. 17(c), the ferrule f in its inclined position is rotated around a vertical axis of rotation on a polishing disc with an elastic abrasive disc mounted (not shown in the figure) on it, thereby forming an oblique convex spherical surface q at the tip of it.

In the aforementioned conventional method for polishing the end face of the optical connector, the center qt of the oblique convex spherical surface q is offset from the point P, as shown in FIG. 18, because the position of qt, the center of the said surface affects Ft, the center of the horizontal surface F, and because the contact with the polishing disc mounted with an elastic abrasive disc creates an unbalance due to the inclination of the ferrule f (for instance, when the angles at the corners fa and fb are different).

SUMMARY OF THE INVENTION

In view of the foregoing, it is the object of this invention to provide a method for manufacturing an optical fiber assembly with a polished end face, an apparatus for polishing the end face of such an assembly and a method for checking the end point of an end-face polishing process of the optical fiber to effect stabilization and minimization of insertion loss and light reflected back to the source.

It is the first object of the present invention to provide a method for manufacturing an optical fiber assembly with polished end face, wherein said optical fiber assembly consisting of an optical fiber and a ferrule is polished to form a conical surface at the end face such that, central axis of said conical surface makes an inclination of θ° with respect to the optical axis of said optical fiber, top of said conical surface coincides with the optical axis of said optical fiber, and has a taper angle of α°, said optical fiber assembly is further polished to form a convex spherical surface at the end face such that, central axis of said convex spherical surface makes an inclination of θ° with respect to the optical axis of said optical fiber.

It is the second object of this invention to provide a method for manufacturing an optical fiber assembly with polished end face, wherein a ferrule having an insertion hole is polished to form a conical surface at the end face such that, central axis of said conical surface makes an inclination of θ° with respect to the axis of said insertion hole, the top of said conical surface coincides with the axis of said insertion hole, and has a taper angle of α°, an optical fiber then inserted into said insertion hole of the ferrule to form an optical fiber assembly, said optical fiber assembly is then polished to form a convex spherical surface at the end face such that, the central axis of said convex spherical surface makes an inclination of θ° with respect to the optical axis of said optical fiber.

It is the third object of this invention to provide an end face polishing apparatus, comprising a rotatable polishing disc having a horizontal polishing surface, a spindle rotatable around an axis of rotation which makes an angle of α° with respect to a line vertically erected on said polishing surface, said spindle retaining a ferrule having an insertion hole or an optical fiber assembly consisting of an optical fiber and a ferrule wherein the axis of said insertion hole or optical axis of said optical fiber makes an inclination of θ° with respect to said axis of rotation, a shifting means that can bring into contact the ferrule or the optical fiber assembly retained by said spindle with said polishing surface or alienate the ferrule or the optical fiber assembly retained by said spindle from said polishing surface.

It is the fourth object of this invention to provide an end face polishing apparatus, comprising a rotatable polishing disc having a concave polishing surface or an elastic abrasive disc mounted polishing surface, a spindle rotatable around an axis of rotation which coincides with a line vertically erected on said polishing surface at the polishing point, said spindle retaining an optical fiber assembly consisting of an optical fiber and a ferrule wherein the optical axis of said optical fiber makes an inclination of θ° with respect to said axis of rotation, a shifting means that can bring into contact the optical fiber assembly retained by said spindle with said polishing surface or alienate the optical fiber assembly retained by said spindle from said polishing surface.

It is the fifth object of this invention to provide an end face polishing apparatus, comprising a rotation reverse means which prevents the twisting of the optical fiber cable by reversing the rotation of the spindle.

It is the sixth object of this invention to provide an end face polishing apparatus, wherein said rotation reverse means reverses the rotation of the spindle in synchronization with a change in the orientation of the ferrule or the optical fiber assembly consisting of an optical fiber and a ferrule with respect to the direction of rotation of the polishing disc.

It is the seventh object of this invention to provide a method for examining the end point of end-face polishing process of the optical fiber, wherein while said optical fiber assembly consisting of an optical fiber and a ferrule is being polished to form a conical surface at the end face such that, the central axis of said conical surface makes an inclination of $\theta°$ with respect to the optical axis of said optical fiber, the top of said conical surface coincides with the optical axis of said optical fiber, and has a taper angle of $\alpha°$, a laser beam is passed through the non-polishing end of the optical fiber and the coincidence of the top of said conical surface with the optical axis of said optical fiber is examined by detecting any change in the light reflected at the polishing end.

It is the eighth object of this invention to provide an end face polishing apparatus, comprising a laser beam passing means for passing a laser beam through the other end of the optical fiber during oblique conical surface polishing of one end, a reflected light detecting means for detecting any change in the light reflected at the polishing end of the fiber, and thus enabling an examination of the coincidence of the top of said conical surface with the optical axis of said optical fiber by detecting any change in the light reflected at the polishing end.

In the method for manufacturing optical fiber assembly with polished end face according to the aforementioned first and second objects and in the end face polishing apparatus according to the aforementioned third and fourth objects, the end face of a ferrule or an optical fiber assembly consisting of an optical fiber and a ferrule is polished to form a conical surface at said end face such that, the central axis of said conical surface makes an inclination of $\theta°$ with respect to the optical axis of said optical fiber, the top of said conical surface coincides with the optical axis of said optical fiber, and has a taper angle of $\alpha°$. Thereafter, said optical fiber assembly consisting of an optical fiber and a ferrule is further polished to form a convex spherical surface at said end face such that, the central axis of said convex spherical surface makes an inclination of $\theta°$ with respect to the optical axis of said optical fiber.

During polishing of the end face to obtain the spherical surface, the polishing process is carried out from both the top and the edge of the conical surface, thereby forming an oblique convex spherical surface with satisfactory balance, having a center which is not offset from the optical axis point of the optical fiber, and enabling the insertion loss and light reflected back to the source to be stabilized and minimized.

In the end face polishing apparatus according to the aforementioned fifth object, because the twisting of the optical fiber cable is prevented by reversing the direction of rotation of the optical fiber assembly consisting of an optical fiber and a ferrule, the end face of said optical fiber assembly can be polished satisfactorily even with the optical fiber cable attached to said optical fiber assembly.

In the end face polishing apparatus according to the aforementioned sixth object, because the direction of rotation of the optical fiber assembly consisting of an optical fiber and a ferrule is reversed and the reversing position is set at a specific position, the unbalance in the polishing process which occurs due to reverse rotation is prevented.

In the method for examining the end point of end-face polishing process according to the aforementioned seventh object and in the end face polishing apparatus according to the aforementioned eighth object, a laser beam is passed through the end of the optical fiber other than the polishing end during the polishing of the oblique conical surface at one end, the change in quantity of reflected light which occurs because of the change in angle of the end face of the optical fiber formed by polishing is detected, and the end point of the conical surface polishing process of the end face of the assembly comprising the optical fiber and ferrule is examined according to the said change.

Thereby, polishing can be carried out while virtually checking the coincidence of the top of the conical surface and the point where the optical axis of the optical fiber intersects with said conical surface.

SPECIFIC DESCRIPTION OF THE EMBODIMENTS

First Embodiment

Figure 1:
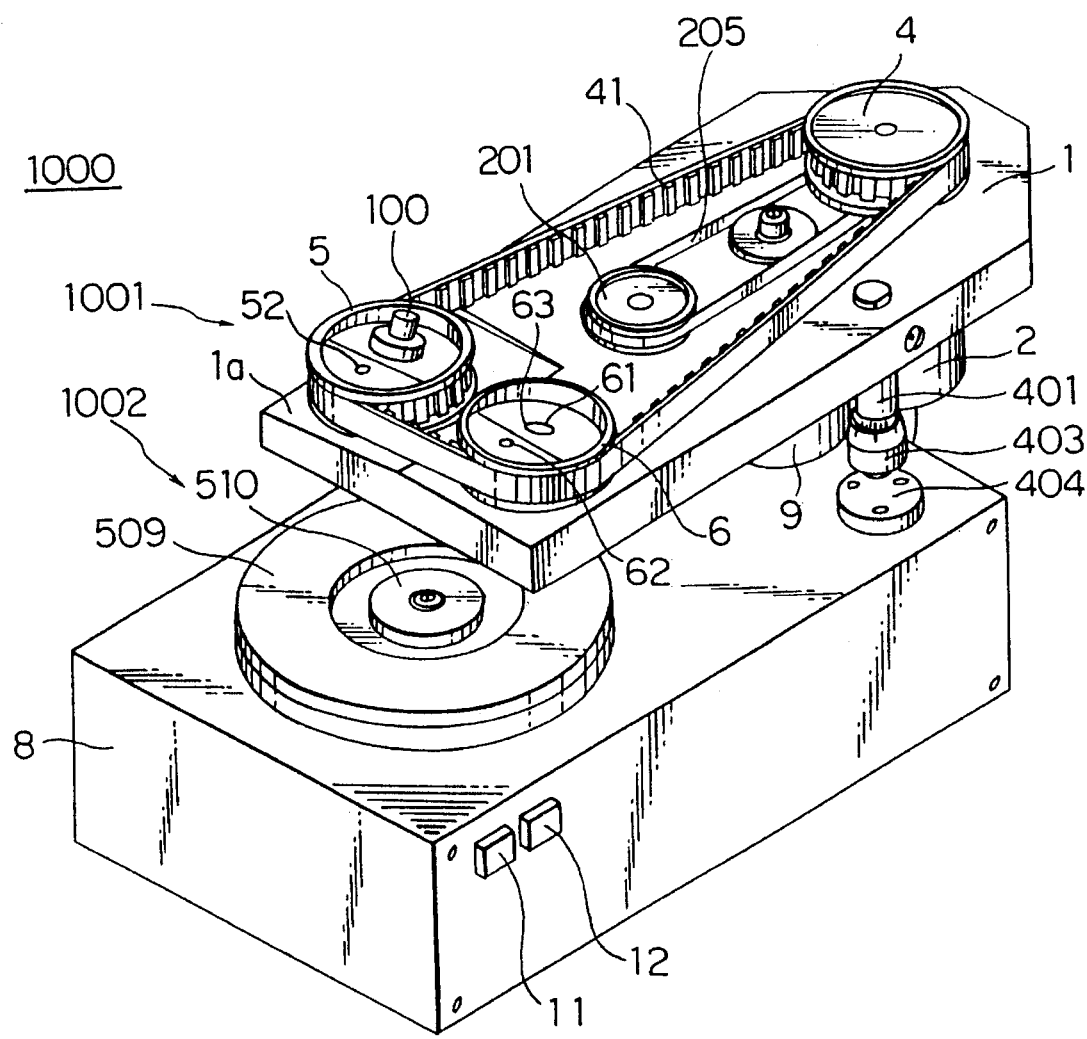
FIG. 1 is a perspective view of the end face polishing apparatus according to the first embodiment of this invention.
Figure 2:
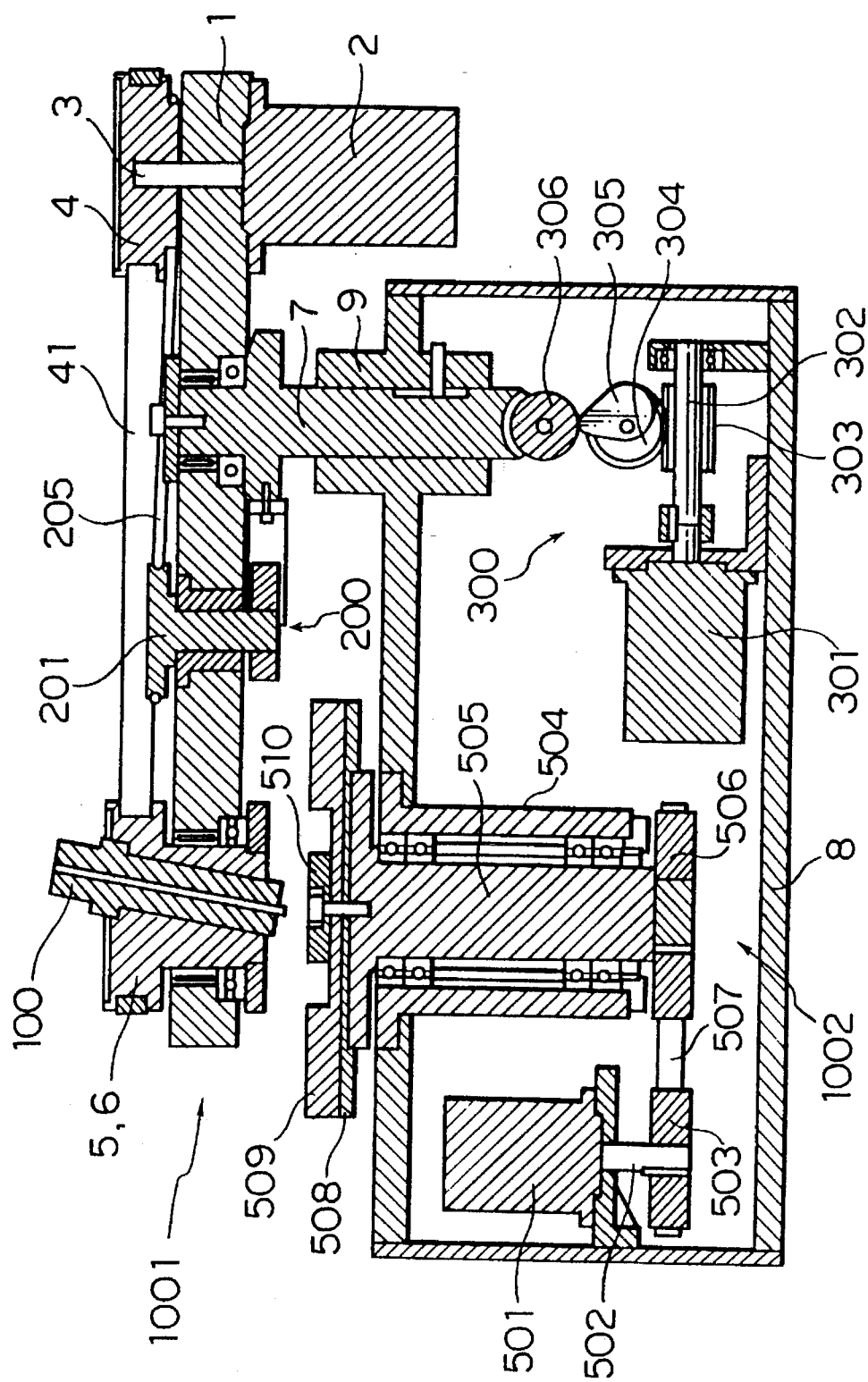
FIG. 2 is a cross section view of the end face polishing apparatus shown in FIG. 1.

FIG. 1 is a perspective view of the end face polishing apparatus according to the first embodiment of the present invention and FIG. 2 is a cross sectional view of said end face polishing apparatus.

The end face polishing apparatus 1000 comprises a jig unit 1001 and a polishing unit 1002.

Reference numeral 8 designates a case, reference numeral 11 designates a power switch and reference numeral 12 designates a start switch.

The jig unit 1001 comprises a jig plate 1, with a reversible motor 2 mounted thereon. A spindle pulley 4 is mounted on motor shaft 3 of said reversible motor 2.

Reference numeral 1a is an oblique surface. This oblique surface 1a makes an angle of 2° with respect to a polishing disc 509, however, said jig plate 1 is horizontal with respect to said polishing disc 509.

The oblique surface 1a comprises a reversible spindle 5 for polishing into an oblique conical surface. Accordingly, the axis of rotation (Ap in FIG. 6) of the reversible spindle 5 is inclined at an angle of 2° with respect to a line (V in FIG. 6) vertically erected on the polishing disc 509. Said jig plate 1 also comprises a reversible spindle 8 for polishing into a spherical surface. However, the axis of rotation (As in FIG. 6) of said reversible spindle 6 coincides with the line V.

Tooth profiles have been cut in the said spindle pulley 4 and the reversible spindles 5 and 6, and a timing belt 41 is stretched around said spindle pulley 4 and said spindles 5 and 6. An idler (not shown in the figures) may be provided if necessary.

Reference numeral 100 designates a collet chuck sleeve (mounted on the reversible spindle 5 in FIG. 1) which can be freely mounted on or dismounted from the reversible spindles 5 or 6.

Figure 6:
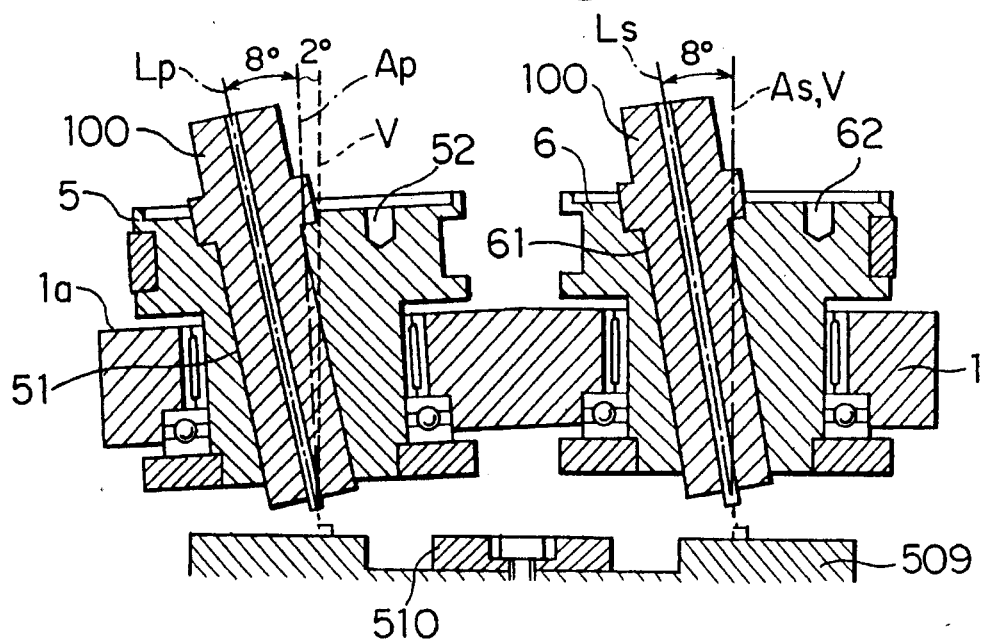
FIG. 6 is a cross section view in the vicinity of the reversible spindle.

Reference numeral 51 (not shown in FIG. 1 and FIG. 2. Refer to FIG. 6), and reference numeral 61 designate insertion holes wherein said collet chuck sleeve 100 can be inserted. Reference numerals 52 and 62 designate bolt holes to accommodate bolts (not shown in the figures) for securing said collet chuck sleeve 100. Reference numerals 53 (not shown in the figures) and 63 designate key slots for locking the rotation of the collet chuck sleeve 100.

Figure 3:
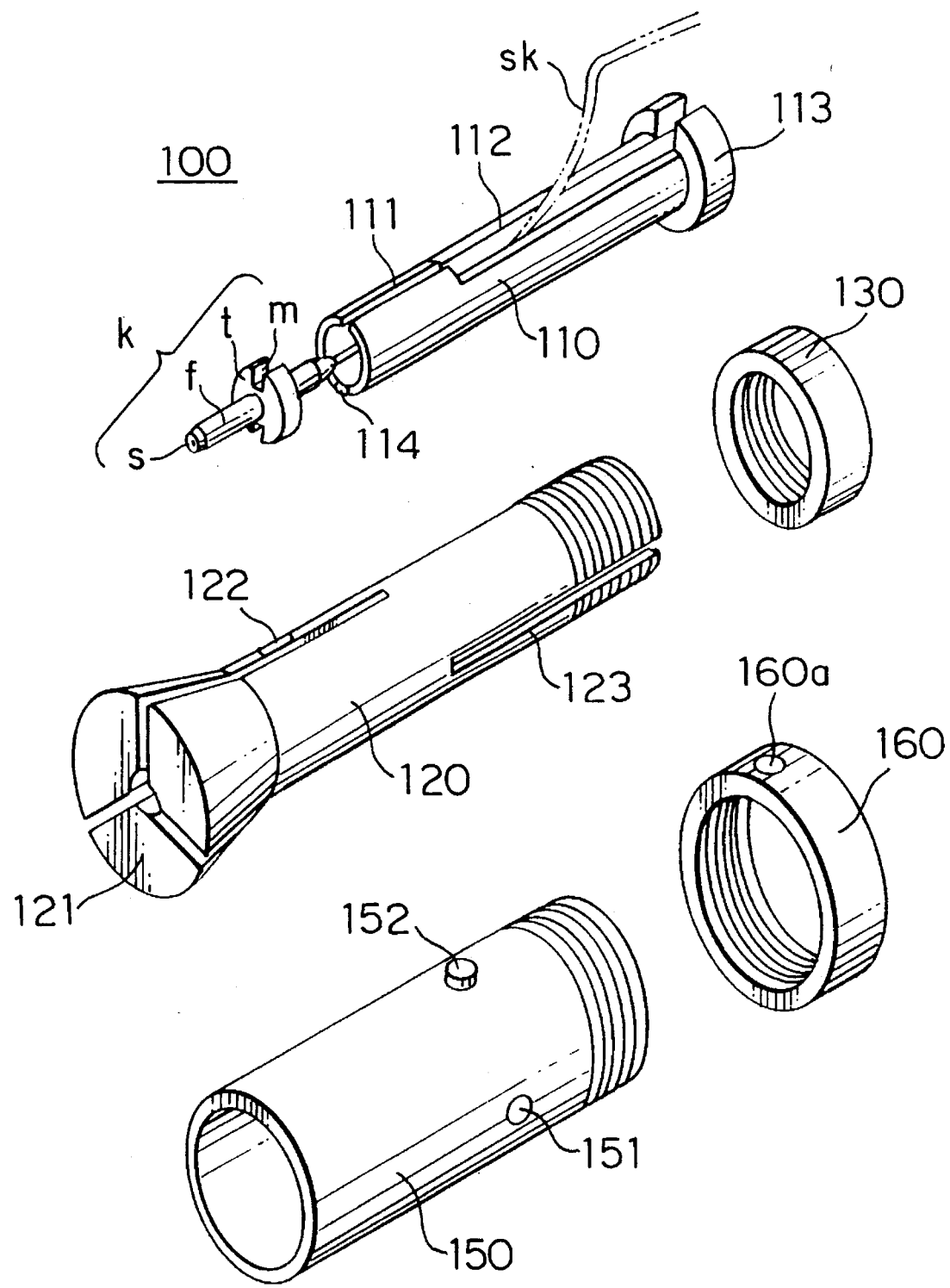
FIG. 3 is an exploded view in perspective of the collet chuck sleeve shown in FIG. 1.
Figure 4:
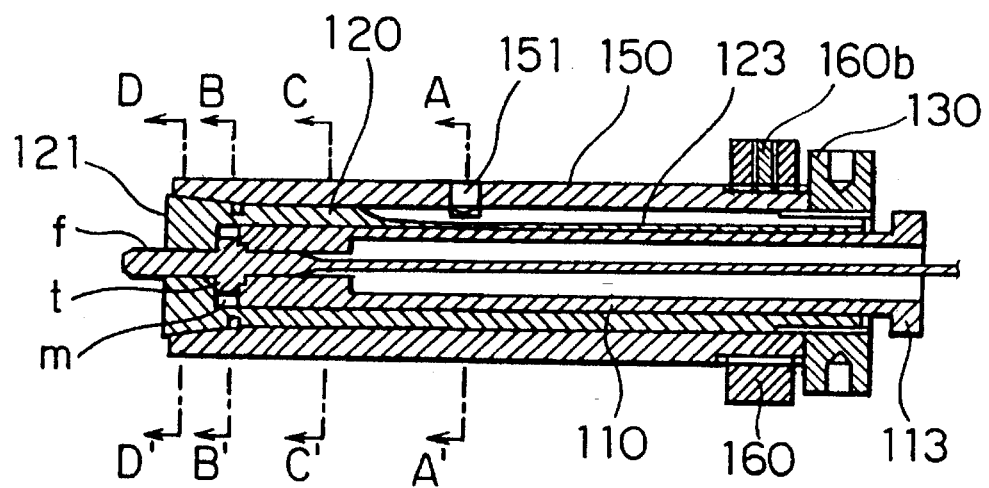
FIG. 4 is a cross section view of the collet chuck sleeve shown in FIG. 1.

FIG. 3 is an exploded view in perspective of the collet chuck sleeve 100. FIG. 4 is a cross section view of the assembly of said collet chuck sleeve 100.

This collet chuck sleeve 100 comprises an optical connector positioning sleeve 110, a collet unit sleeve 120 and collet tightening nut 130, a sleeve 150 and a collet chuck sleeve height-adjusting nut 160.

In FIG. 3, k is an optical connector, f is a ferrule, t is a collar of the ferrule f, m is a slot in the said collar t. s is an optical fiber and sk is an optical fiber cable.

Said optical connector positioning sleeve 110 has a key slot 111, a ferrule slot 112, and a collar 113. A protruding claw 114 is provided on the side opposite to the collar 113 which couples the collar 113 and the slot m of the optical connector k.

A collet 121, a key 122 (protruding inward), and a key slot 123 are provided in said collet unit sleeve 120.

A key 151 (protruding inward) and a key 152 are provided in the said sleeve 150.

A bolt hole 160a (bolt is 160b in FIG. 4) is provided in said collet chuck sleeve height-adjusting nut 160 to lock said nut and to prevent it from rotation with respect to said sleeve 150.

Figure 5A:
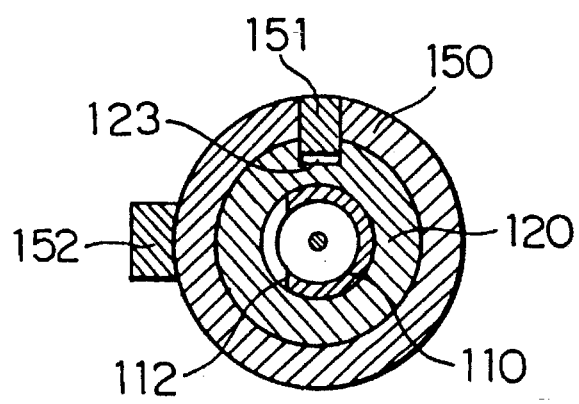
FIG. 5(a) is the cross section view at A-A' shown in FIG. 4, (b) is the cross section view at B-B' shown in FIG. 4, (c) is the cross section view at C-C' shown in FIG. 4, finally, (d) is the cross section view at D-D' shown in FIG. 4.

For assembling the collet chuck sleeve 100, first, the collet unit sleeve 120 is inserted in the sleeve 150, such that the key 151 is positioned in the key slot 123 (refer to FIG. 5(a), which is the cross section view at A-A' shown in FIG. 4). Next, the collet chuck sleeve height-adjusting nut 160 is screwed in until the specified position on the sleeve 150, and secured by bolt 160b. The collet tightening nut 130 is loosely screwed on said collet unit sleeve 120.

Figure 5C:
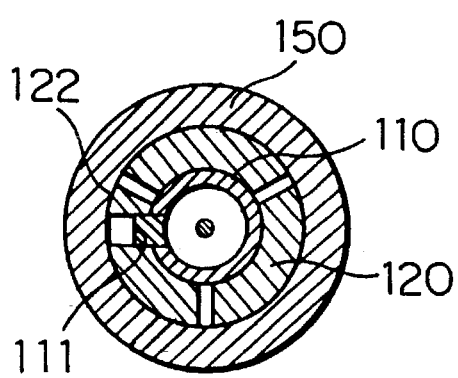
Figure 5B:
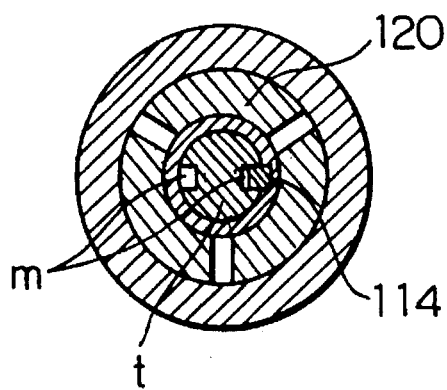

On the other hand, optical connector k is held in place in the optical connector positioning sleeve 110 by engaging the claw in the said slot m (refer to FIG. 5(b), which is the cross section view at B-B' shown in FIG. 4), while inserting the optical fiber cable sk in the tube section of the optical connector positioning sleeve 110 through key slot 111 and ferrule slot 112.

Figure 5D:
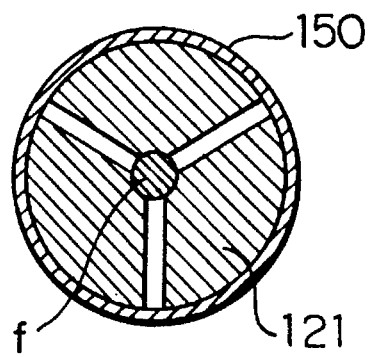

Next, said optical connector positioning sleeve 110, together with the optical connector k, is inserted in said collet unit sleeve 120, while positioning said sleeve 110 such that the key 122 is engaged with the key slot 111 (refer to FIG. 5(c), which is the cross section view at C-C' shown in FIG. 4). Thereafter, loosely-screwed collet tightening nut 130 is screwed firmly so that the ferrule f is tightened and secured in the collet 121 (refer to FIG. 5(d), which is the cross section view at D-D' shown in FIG. 4).

For polishing into an oblique conical surface described below, the collet chuck sleeve 100 is inserted in the insertion hole 51 to fit said collet chuck sleeve 100 in the end-face polishing apparatus 1000, and key 152 is engaged in the key slot 53 so that the collet chuck sleeve 100 and reversible spindle 5 are positioned. When the process of polishing into an oblique conical surface is completed, the collet chuck sleeve 100 is inserted in the insertion hole 61 for spherical polishing described below, key 152 is engaged in the key slot 63 so that the collet chuck sleeve 100 and reversing spindle 6 are positioned.

FIG. 6 is a cross section view in the vicinity of the reversible spindles 5 and 6. For convenience, the figure shows the collet chuck sleeve 100 fitted to both the reversible spindles 5 and 6.

Central axis Lp (same as the optical axis L of optical connector k) of insertion hole 51 is inclined at an angle of 8° with respect to the axis of rotation Ap of the reversible spindle 5. Furthermore, the axis of rotation Ap of the reversible spindle 5, is inclined at an angle of 2° with respect to the line V vertically erected on the polishing disc 509.

Therefore, the central axis Lp of the insertion hole 51 makes a total inclination of 10° with respect to said line V. Central axis Ls (same as the optical axis L of the optical connector k) of the insertion opening 61 is inclined at an angle of 8° with respect to the axis of rotation As of the reversing spindle 6. The axis of rotation As of the reversible spindle 6 coincides with said line V. Therefore, the central axis Ls of the insertion opening 61 makes only an angle of 8° with respect to said line.

Referring back to FIG. 2, the jig plate 1 is supported by the feed shaft 7 which can shake the jig plate 1 transversely or move the jig plate 1 vertically. Transverse shaking is performed by a jig plate shaking device 200. Vertical movement is performed by jig unit raising/lowering device 300.

Figure 7:
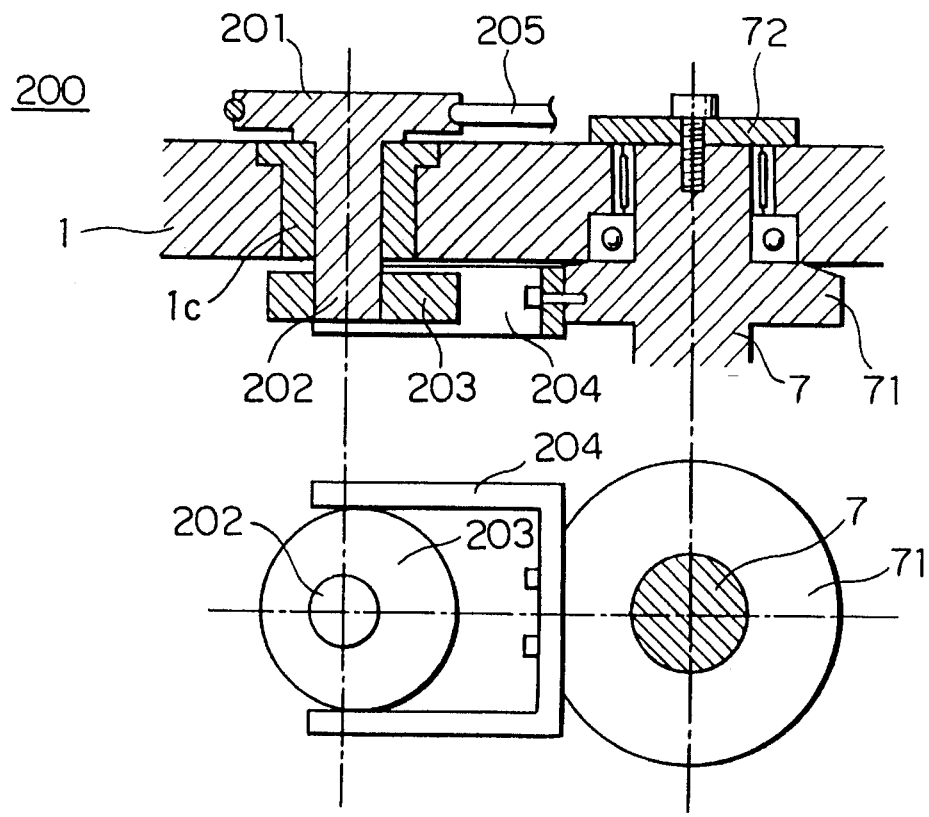
FIG. 7 is a cross section view of the jig plate shaking device.

FIG. 7 is a cross section view of the jig plate shaking device 200.

A pulley 201 is supported by a slide bearing 1c of said jig plate 1. An eccentric disc 203 is fixed on a pulley shaking shaft 202. A fork 204 is secured to the collar 71 of the feed shaft 7 by bolts. A shaking cam is formed by comprising said fork 204 and said eccentric disc 203.

As shown in FIG. 1, a rubber belt 205 is stretched around said pulley 201 and the spindle pulley 4. When the spindle pulley 4 rotates due to a drive of the reversible motor 2, the pulley 201; the pulley shaking shaft 202; and the eccentric disc 203 rotate. Moreover, the pulley shaking shaft 202 starts shaking because of the eccentric disc 203 being constrained by the fork 204, thereby causing the jig plate 1 to be shaked transversely.

Figure 8:
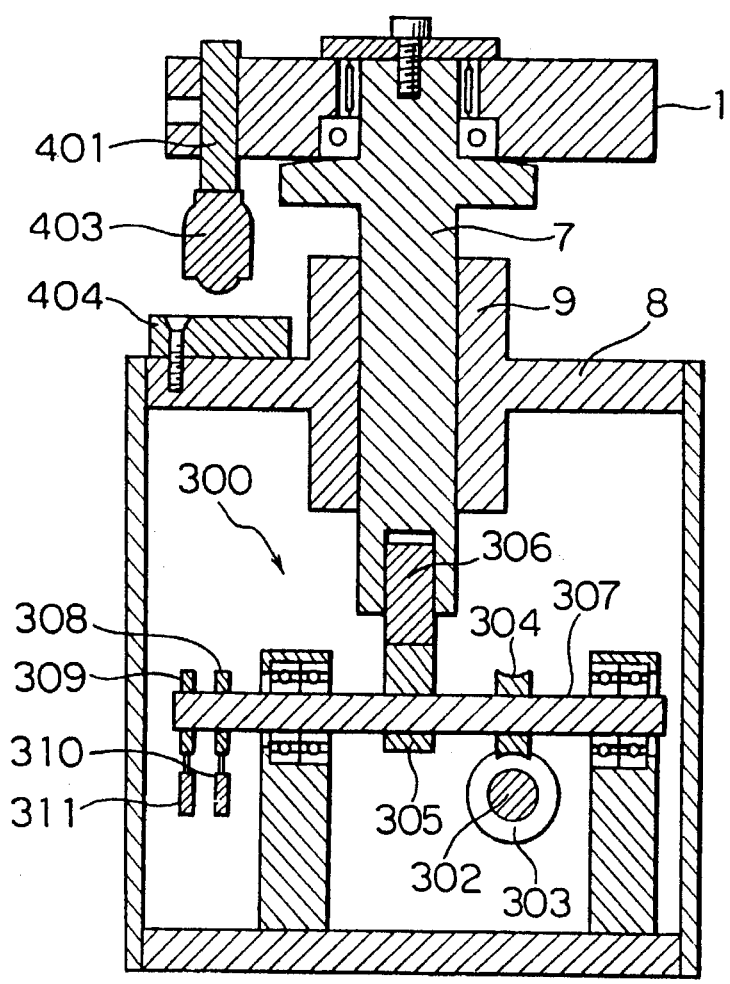
FIG. 8 is a cross section view of the jig unit raising/lowering device.

FIG. 8 is a schematic cross section view of the jig unit raising/lowering device 300.

Referring to FIG. 8 and FIG. 2 for further explanation, a roller 306 supported by a cam 305, is fitted at the bottom end of the feed shaft 7. Said cam 305 fitted to a cam shaft 307, is provided with a worm wheel 304. Said worm wheel 304 is engaged with a worm 303 fitted on the motor shaft 302.

When cam 308, meant for detecting a top position, detects the top position and presses a micro-switch 310, a top position detected signal is output.

When cam 309, meant for detecting a bottom position, detects the bottom position and presses a micro-switch 311, a bottom position detected signal is output.

Stopper shaft 401 is secured by screws to the jig plate 1. Bottom end of this stopper shaft 401 is provided with a micrometer head 403. Said micrometer head 403 is stopped by a stopper plate 404 provided on the upper surface of the case 8.

When the motor shaft 302 and the worm 303 are driven by the cam shaft drive motor 301, the worm wheel 304 and the cam shaft 307 rotate, thereby causing the cam 305 to rotate. As the cam 305 rotates, the supporting position of the roller 306 moves up and down causing a vertical motion of the jig plate 1, by a transmission through the feed shaft 7. The lower limit of said vertical motion, however, will be the position decided by the micrometer head 403.

Returning to FIG. 2, in the polishing unit 1002, the polishing disc 509 and a polishing disc stand 508 are secured to the upper end flange of the polishing disc shaft 505 by a retaining plate 510 and a bolt. The polishing disc shaft 505 is rotatably retained in the cylinder 504 which is inserted through the upper surface of the case 8 and secured. A belt pulley 506 is provided at the lower end of the polishing disc shaft 505. Motor shaft 502 of the polishing disc drive motor 501 is also provided with a belt pulley 503. A flat belt 507 is stretched around the belt pulleys 503 and 506.

When the motor shaft 502 and the belt pulley 503 are driven by the polishing disc drive motor 501, the belt pulley 506 rotates by a transmission through the flat belt 507, thereby causing the polishing disc shaft 505; the polishing disc stand 508 and the polishing disc 509 to rotate.

Figure 9:
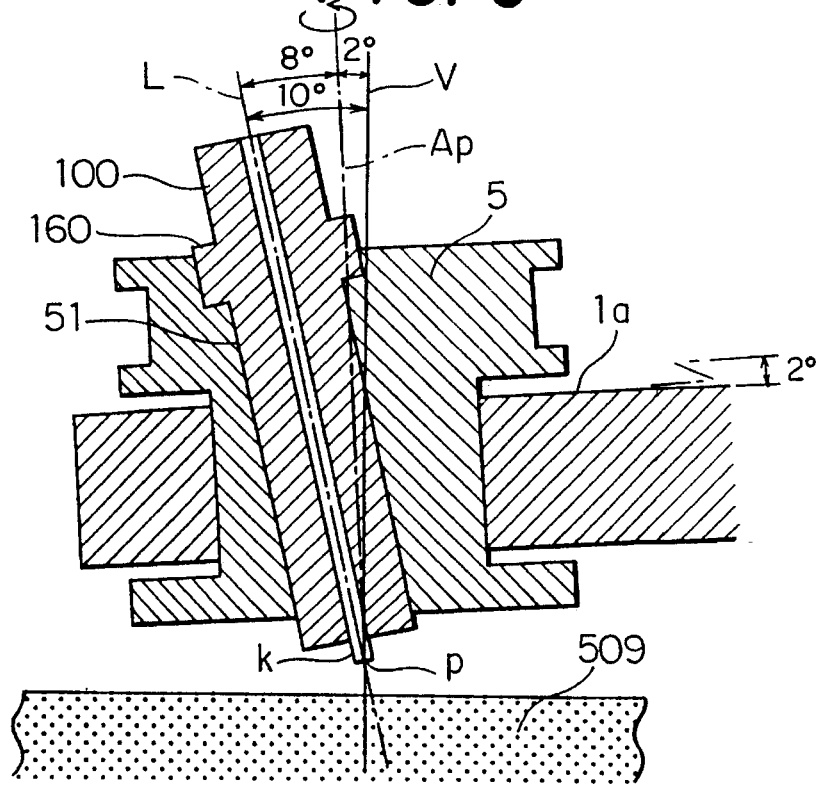
FIG. 9 is a cross section view in the vicinity of the reversible spindle used in the oblique conical surface polishing process.

FIG. 9 is a schematic cross section view for explaining the polishing process into an oblique conical surface.

Optical connector k is secured in the collet chuck sleeve 100 and inserted in the insertion hole 51 of the reversible spindle 5 for polishing into an oblique conical surface. Optical axis L of the optical connector k is inclined at an angle of 8° with respect to Ap, the axis of rotation of the reversible spindle 5. Moreover, said axis of rotation Ap is inclined at an angle of 2° with respect to line V vertically erected on the polishing disc 509.

The position of the end face of the optical connector k is adjusted using the collet chuck sleeve height-adjusting nut 160. Said position of the end face of the optical connector k is so adjusted that, the point P where the optical axis L intersects with the end face coincides with the axis of rotation Ap of the reversible spindle 5.

Next, the power switch 11 is turned on to operate the polishing disc 509, the reversible spindle 5, the jig plate shaking device 200 and the like. The polishing disc 509 has a rotation speed of 66 m/second at the polishing point and a rotation period of 15 seconds. Reversible spindle 5 switches the direction and rotates in the reverse direction every second. Said reverse rotation is essentially to avoid any twisting of the optical fiber cable sk. If there is no possibility of twisting the optical fiber cable sk, the spindle may be allowed to be rotated in a single direction only. The jig plate 1 is made to shake transversely to avoid a coincidence of the polishing point at a single location of the polishing disc 509.

Next, the start switch 12 is turned on, the jig unit lowering/raising device 300 lowers the jig unit 1001 and the tip of the ferrule f is brought in contact with the polishing disc 509 where it is polished.

At the point when the reversible spindle 5 reverses the rotation direction, a pause state occurs because of the inertial moment of the reversible spindle 5, and stretching and elongation of the timing belt 41, which may cause an unbalance in the polishing amount. To suppress such an unbalance, rotation of said reversible spindle 5 is synchronized with a change in the orientation of the optical axis L with respect to the axis of rotation Ap. Said reversible spindle 5 rotates in a direction in which the angle between the optical axis L and the polishing disc 509 is acute.

After every one rotation of the cam 305, the above explained process of polishing into an oblique conical surface is terminated automatically and the jig unit 1001 rises.

A completion of the process of polishing into an oblique conical surface can be checked by introducing a laser beam of wavelength 1.3 μm through the other end of the optical fiber cable sk and detecting a change in the power of the returned beam at the interface according to the change in angle of the end face of the optical fiber s. A method for checking the end point of end-face polishing process and the apparatus for checking the same are explained in the third embodiment.

Figure 10A:
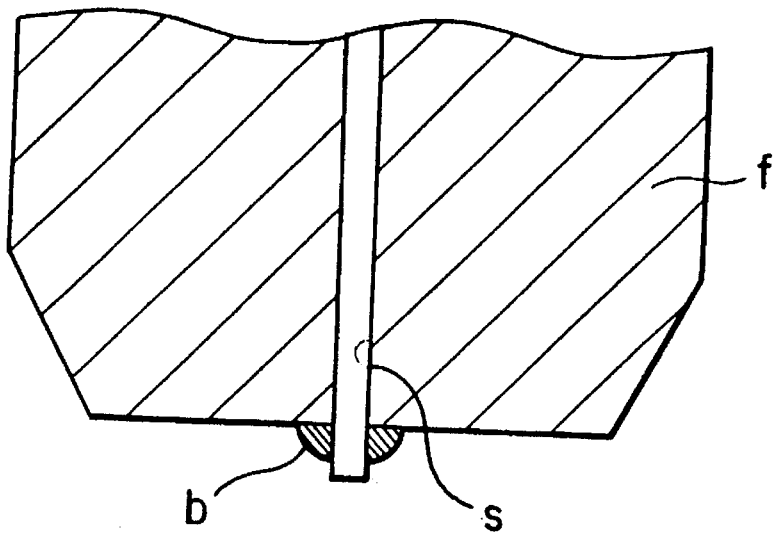
FIGS. 10 are cross section views for explaining the oblique conical surface polishing process.

FIG. 10(a) is the cross section view of the tip of the optical connector k before it is polished into an oblique conical surface, showing the optical fiber s and the tapered tip edge part of the ferrule f bonded by an adhesive b.

Figure 10B:
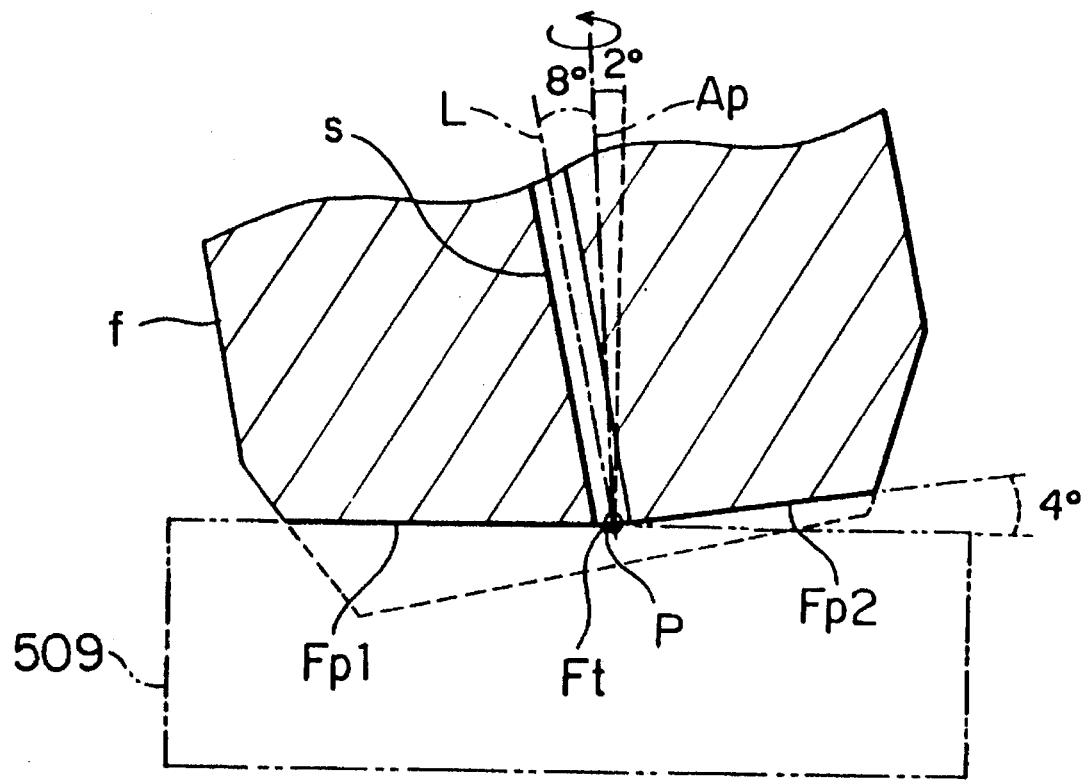

FIG. 10(b) is the cross section view of the tip of the optical connector k after completion of the process of polishing into an oblique conical surface, showing the tip of the ferrule f cut to a conical surface with a taper angle of 2° with respect to the axis of rotation Ap taken as the central axis, and the top Ft of the conical surfaces Fp1 and Fp2 coinciding with a point P where the optical axis L of the optical fiber s coincides with said conical surface.

Figure 11:
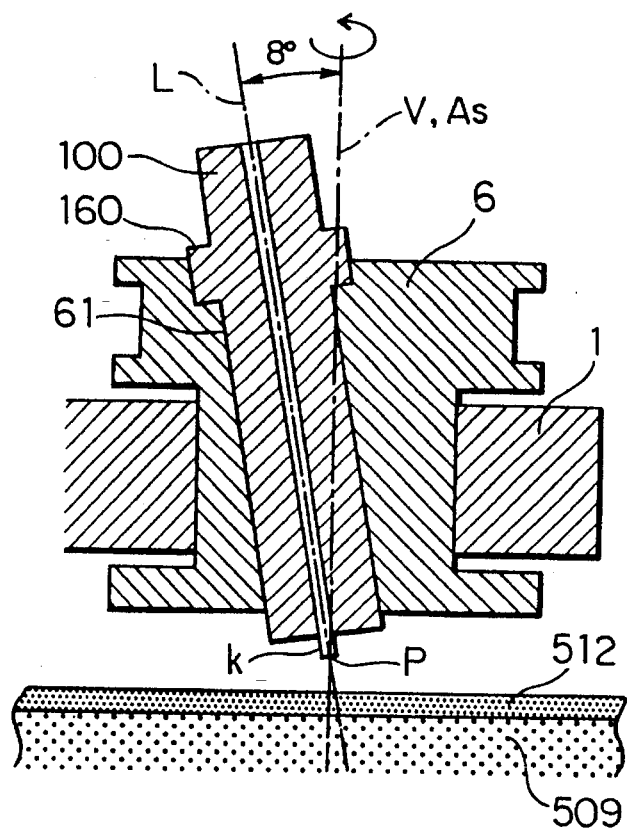
FIG. 11 is a cross section view in the vicinity of the reversible spindle used in the spherical surface polishing process.

FIG. 11 is a schematic cross section view for explaining the process of polishing into a spherical surface.

On completion of the above mentioned process of polishing into an oblique conical surface, the power switch 11 is turned off. Collet chuck sleeve 100 is removed from the reversible spindle 5 and inserted in the insertion hole 61 of the reversible spindle 6. At this stage, the optical axis L of the optical connector k is inclined at an angle of 8' with respect to As, the axis of rotation of the reversible spindle 6, and this axis of rotation As coincides with the line V vertically erected on the polishing disc 509.

Next, an elastic abrasive disc 512 is mounted on said polishing disc 509.

The position of the end face of the optical connector k can be adjusted using the collet chuck sleeve height-adjusting nut 160. Said position of the end face of the optical connector k is adjusted to such a height that, when said end face is polished obliquely into a spherical surface, the point P where the optical axis L intersects with the end face and the axis of rotation As of the reversible spindle 6 coincide. However, this adjustment can be made unnecessary if the heights of each component are set accurately beforehand.

Next, the power switch 11 is turned on to operate the reversible spindle 6, the elastic abrasive disc 512, the jig plate shaking device 200 and the like.

The start switch 12 is turned on, the jig unit lowering/raising device 300 lowers the jig unit 1001 and the tip of the ferrule f is brought in contact with the elastic abrasive disc 512 where it is polished.

Figure 12A:
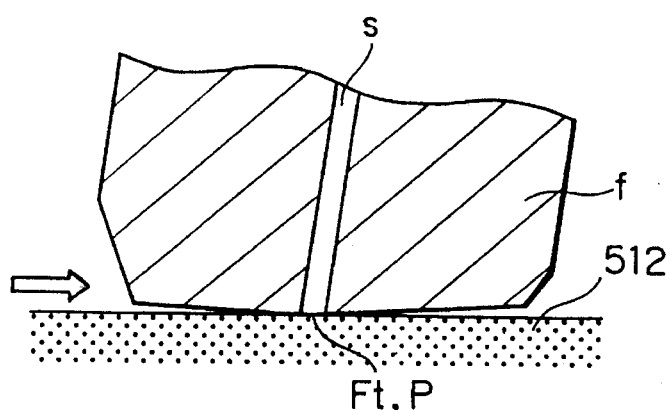
FIGS. 12 are a cross section view used for explaining the spherical surface polishing process.
Figure 12B:
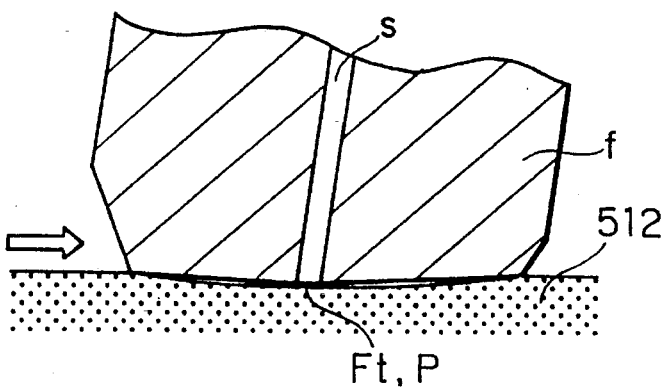

As shown in FIG. 12(a), since the end face of the ferrule f has a conical surface having a top Ft before the start of the above mentioned process of polishing into a spherical surface, said top Ft first comes in contact with the elastic abrasive disc 512 and it is polished. If the lowering of the jig unit 1001 is continued further, the elastic abrasive disc 512 becomes concave, as shown in FIG. 12(b), so that the corners of the conical surface come in contact with the elastic abrasive disc 512 and are polished. Thus in the present invention, polishing progresses at 3 locations, the top Ft and the two corners of the conical surface, unlike the conventional polishing process where the polishing progresses only at the two corners of the conical surface.

Figure 13:
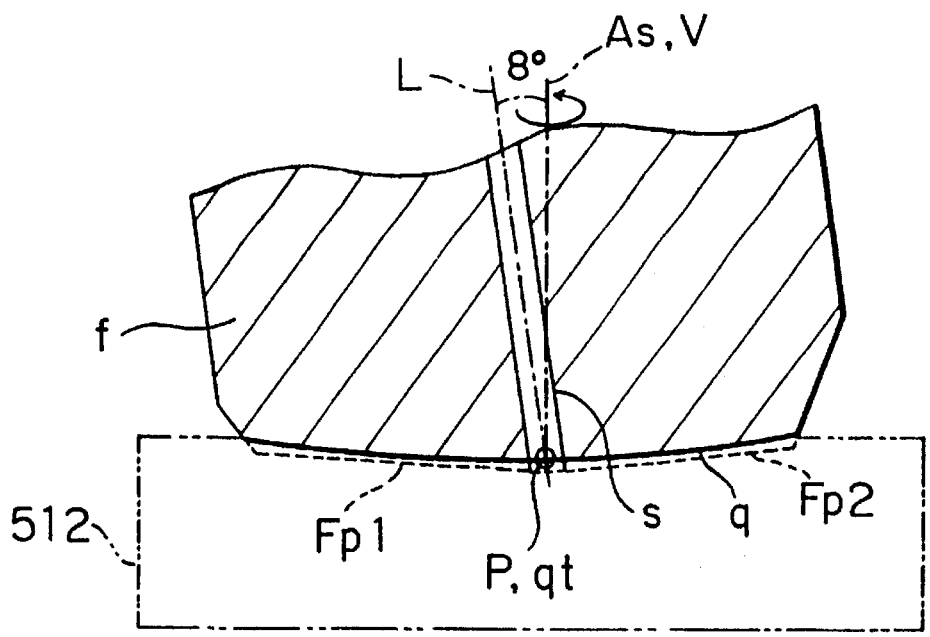
FIG. 13 is a cross section view after completion of the polishing process.

Accordingly, as shown in FIG. 13, the oblique convex spherical surface q with a satisfactory balance is formed, and center point qt therein, is not offset from the optical axis point P, enabling insertion loss and light reflected back to the source to be stabilized and minimized.

In the aforementioned embodiment, the angle of inclination of the axis of rotation Ap of the oblique conical surface was taken as 2° with respect to a line V vertically erected on the polishing disc 509, however, any angle in the range 1.5° to 3° may be used. If the angle is smaller than 1.5°, polishing the top Ft at the center becomes difficult, and there will be no change from the prior art. If the angle is larger than 3°, the amount to be polished becomes large, and the polishing time increases thereby. Furthermore, the top Ft may become excessively sharp-pointed and may damage the elastic abrasive disc 512.

A polishing disc with a concave spherical surface may be used for spherical surface polishing instead of said elastic abrasive disc 512.

Using the aforementioned end-face polishing apparatus 1000, optical connector k with an optical fiber s of single mode (refractive index difference ratio $\Delta=0.3$, mode field diameter=9.5 μm) for a wavelength of 1.3 μm, was polished and oblique convex spherical surface qt with a radius of 20 mm was formed. The mean value of curvature symmetry (offset angle between the center qt of the oblique convex spherical surface q and the point P where the optical axis of the optical fiber s coincides with said conical surface of the optical fiber s) after polishing a sum of 50 connectors was 0.014° and the standard deviation was 0.003°.

The connector k was then connected to a master connector and the return loss given by, $$RL=-10\times ln(PR/PT) \tag{1}$$

(where PR is power of light reflected back to source; and PT is power of incident light), was calculated. The mean value of RL was found to be 68 dB and its standard deviation was 1 dB.

Said connector k was then removed and the return loss RL was calculated again after bringing the master connector end face directly into contact with the air layer. This time the return loss RL was found to be 63 dB.

Next, said connector k was again connected to the master connector and the insertion loss CL given by, $$CL=-10\times ln(P1/P0) \tag{2}$$

(where P0 is power of incident light; and P1 is power of light emitted power from the connector under measurement), was calculated. The mean value of CL was found to be 0.12 dB, and its value in the worst case was 0.32 dB.

Also, using the aforementioned end-face polishing apparatus 1000, the optical connector k with the optical fiber having a dispersion shift (specific refractive index difference $\Delta=0.8$, mode field diameter=8.5 μm) for a wavelength of 1.55 μm, was polished and oblique convex spherical surface q with a radius of 20 mm was formed. The mean value of curvature symmetry after polishing a sum of 50 connectors was 0.014° and the standard deviation was 0.003°.

The connector k was then connected to a master connector and it was found this time that, the return loss RL was 64 dB, the standard deviation was 1 dB, and also that all the 50 tested optical connectors had a return loss RL of at least 60 dB. Said connector k was then removed from the master connector and the end face of the master connector end face was brought in contact with the air layer. The return loss RL measured in this case was 48 dB. This shows that, a physical contact is maintained in mutual connections of the tested connector. The return loss RL from single mode optical fiber deteriorates by 4 dB, however, this is due to a large difference in refractive index, and also due to an increase in the return power because of Rayleigh scattering from the optical fiber s.

Measurement of insertion loss CL gave a mean value of 0.15 dB, with the worst value as 0.35 dB.

Second Embodiment

In the oblique conical surface polishing process in the aforementioned First Embodiment, the end face of ferrule f with the optical fiber s inserted therein and bonded thereto was polished, however, the end face of the ferrule f as an independent unit may be polished to a conical surface beforehand, the optical fiber f inserted in the said ferrule f, and the assembly polished to a spherical surface thereafter.

By receiving the ferrule f as a separate unit with the end face polished to an oblique conical surface, the user has an advantage in that the optical fiber s can be inserted in the ferrule f and the assembly polished to a spherical surface by the user, thereby avoiding the oblique conical surface polishing process.

Furthermore, the polished tip of the optical fiber s and ferrule assembly becomes sharp during the oblique convex spherical surface polishing process, therefore, the optical fiber s is polished first, and offset between the center of the oblique convex spherical surface and the optical axis point of the fiber is minimized.

Third Embodiment

Figure 14:
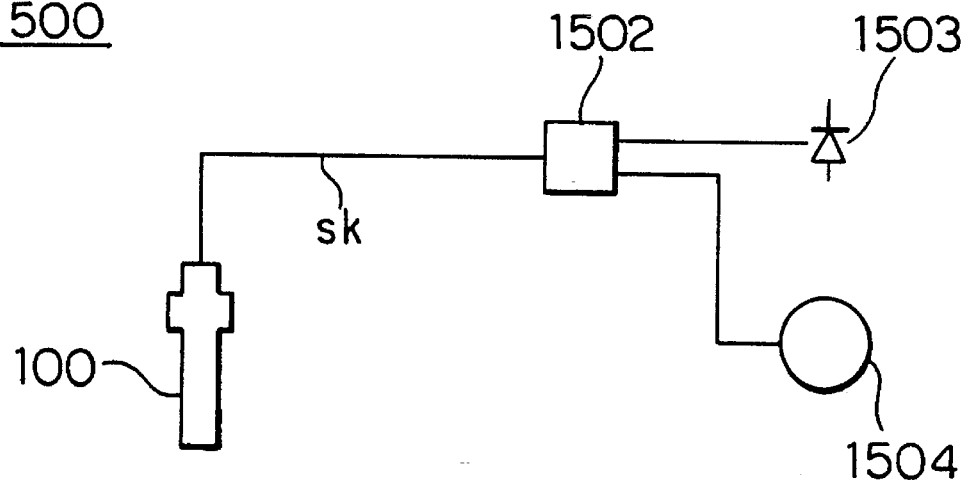
FIG. 14 is a schematic block diagram of the apparatus for examining the polishing condition.

FIG. 14 is the schematic block diagram of the apparatus for checking the polishing condition.

The polishing condition checking apparatus 1500, comprises; a collet chuck sleeve 100, an optical connector k inserted therein, an optical fiber cable sk connected thereto with an end of said optical fiber cable sk connected to a laser diode 1503 and a power meter 1504 through an optical fiber coupler 1502.

Figure 15:
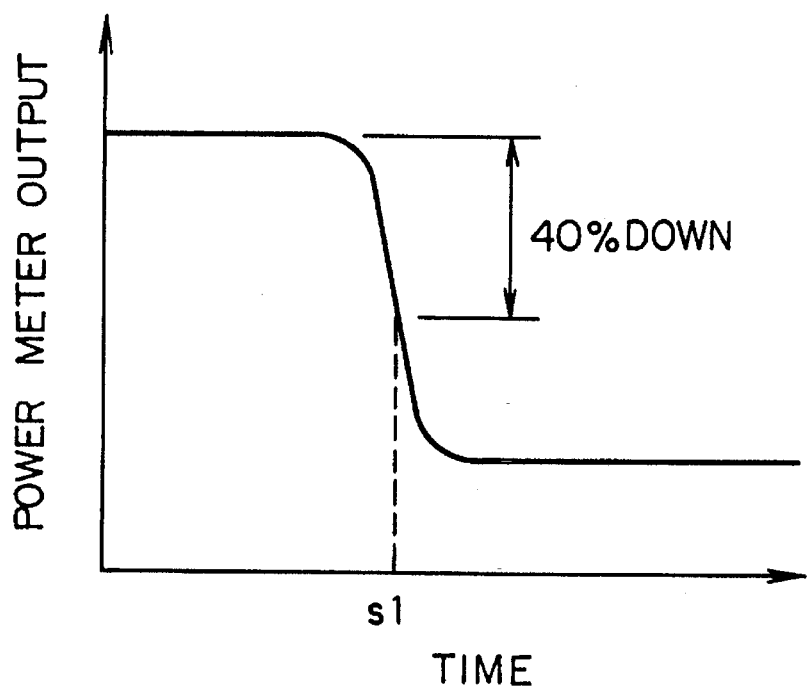
FIG. 15 is a graph showing the change in the power of reflected light detected by the power meter of FIG. 14.
Figure 17A:
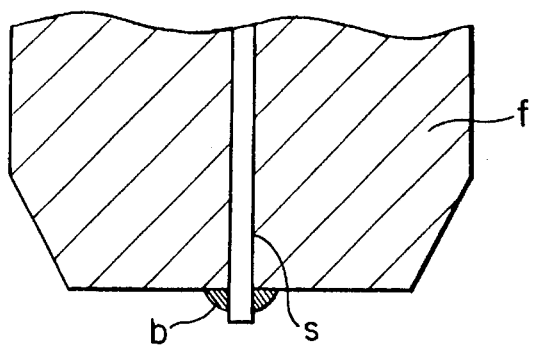
FIGS. 17 are explanatory drawing of the prior art of polishing the assembly consisting of an optical fiber and a ferrule.
Figure 17B:
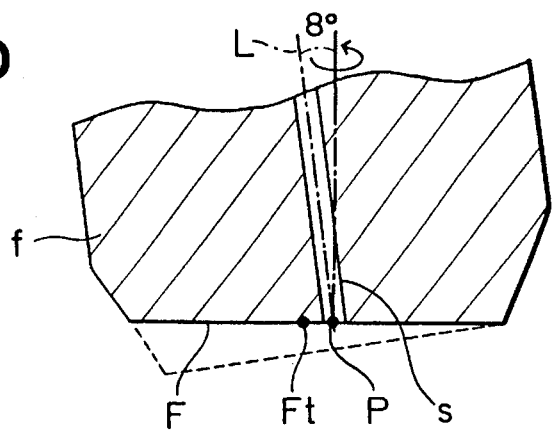
Figure 17C:
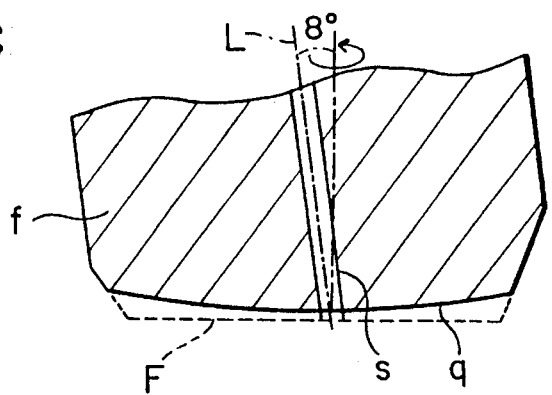
Figure 18:
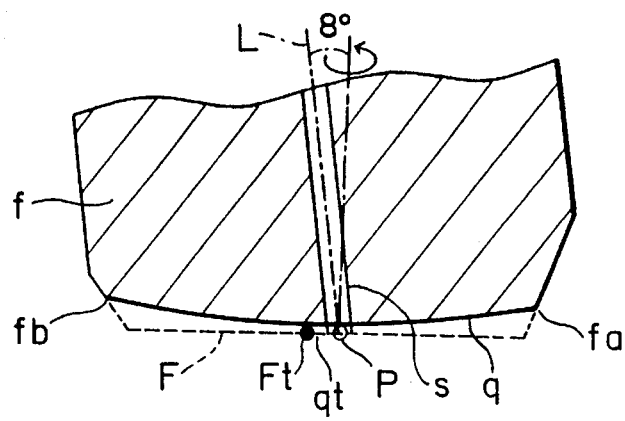
FIG. 18 is a cross section view of the tip of the assembly obtained by the method of polishing an assembly consisting of an optical fiber and a ferrule according to prior art.

Said collet chuck sleeve 100 is inserted in the reversible spindle 5 and polishing of the oblique conical surface is started. A laser beam of wavelength 1.3 µm is passed through the optical fiber cable sk from the laser diode 1503. After the polishing of the oblique conical surface is continued, when the top Ft of the conical surface and the point P of the optical fiber s coincide, the power of the light reflected back to source changes abruptly, as shown in FIG. 15. If this change is detected by the power meter 1504, the end point of polishing process of the oblique conical surface can considered to be accomplished.

FIG. 15 is a graph showing a change in the power of light reflected back to the source detected by the power meter during the oblique conical surface polishing process. If, for instance, the power of light reflected back to the source has reduced to approximately 40% of the power at the start of polishing (in time S1) in this graph, since the optical axis point of the optical fiber and the top Ft of the conical surface has coincided, the polishing process of the oblique conical surface may be judged as completed.

If the aforementioned apparatus 1500 is used for checking the polishing condition, the polishing process can be carried out while practically confirming the coincidence of the top Ft of the conical surface and the optical axis point P of the optical fiber s. If the apparatus is connected to the jig unit raising/lowering device 300, the polishing process can be completed automatically, thereby improving the working efficiency.

Figure 16:
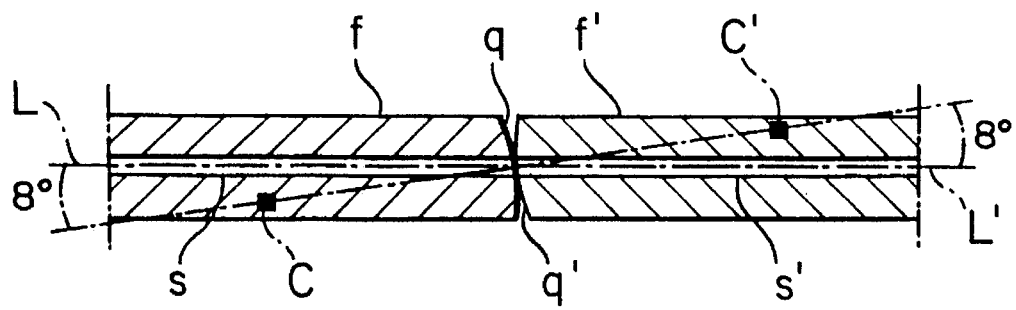
FIG. 16 is an explanatory drawing showing the tips of fiber assemblies comprising an optical fiber and a ferrule in the mutually-connected condition.
Figure 19:
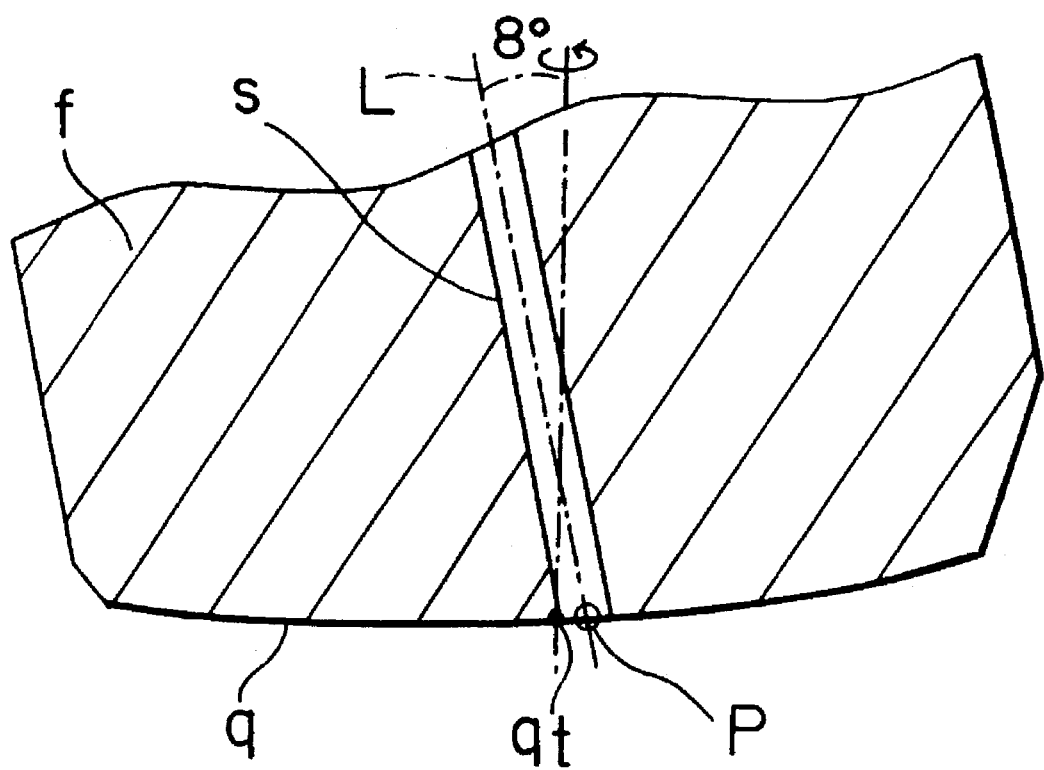
FIG. 19 is a cross section view of the tip of the ferrule.

However, as shown in FIG. 19, if the center qt of the oblique convex spherical surface q is offset from the optical axis point P of the optical fiber s, then as shown in FIG. 16, even if the inclined convex spherical surfaces q and q' are brought in face-to-face contact, the optical axes L and L' of the optical fibers s and s' will not coincide, and hence stabilization and minimization of insertion loss and light reflected back to the source cannot be effected.

In the prior art, as shown in FIG. 19, the center qt of the oblique convex spherical surface q was offset from the optical axis point P of the optical fiber s while polishing the oblique convex spherical surface.

The inventors of the present invention investigated the causes of this offset in depth and found that, while the ferrule f is tightened by the collet 121 and gripped in position, the optical fiber assembly is set in the collet chuck sleeve 100 and the ferrule f is pulled into the collet sleeve 120 because of the nature of construction of the collet chuck. Therefore, the ferrule protuberance (i.e. the length of the ferrule f which protrudes from the collet 121 as shown in FIG. 4) becomes smaller than the required value, resulting in inadequate polishing of the ferrule f.

In order to prevent the ferrule from being pulled into the collet sleeve at the time of setting the optical fiber assembly in the collet chuck sleeve 100, the inventors of the present invention have invented a setting jig.

In general, the setting jig comprises the first sleeve, through which passes the optical fiber from the rear end of the ferrule inserted and secured in the optical fiber assembly, and which is in contact with the said ferrule, the second sleeve wherein the said first sleeve with a collet at the front end which grips the tip of the said ferule is inserted, a tightening nut screwed at the rear end of the second sleeve, and the third sleeve wherein the said second sleeve is inserted, and containing a tapered front end for enclosing the said collet. The setting jig is characterized by the fact that it is used for setting the said optical fiber assembly in the polishing jig which grips the front end of the ferrule in the said collet after the said tightening nut is tightened and the said second sleeve is inserted in the said third sleeve and the collet is closed, and comprises a hole wherein is inserted the polishing jig loosely gripping the said optical fiber assembly, a holder with securing means for securing the third sleeve of the polishing jig which is inserted in the said hole, a stopper in contact with the tip of the ferrule or optical fiber of the optical fiber assembly loosely gripped in the polishing jig retained in the said holder, and a clamp for preventing retreat of the said optical fiber assembly in contact with the rear end of the first sleeve of the polishing jig retained in the said holder.

The above-mentioned setting jig is used as described below.

Firstly, the tightening nut is loosely tightened with the ferrule protuberance adjusted at the required value, and the optical fiber assembly is loosely gripped in the polishing jig. Next, the polishing jig is inserted in the hole of the holder of the setting jig, and the polishing jig is pushed out until the tip of the ferrule touches the stopper, and the third sleeve is secured using the securing means. The clamp is then brought in contact with the rear end of the first sleeve of the polishing jig to prevent the said optical fiber assembly from retreating. In this condition, the tightening nut is firmly tightened, and the optical fiber assembly is gripped firmly in the polishing jig.

With this arrangement, when the tightening nut is firmly tightened, the optical fiber assembly does not retreat, therefore, the ferrule can be prevented from being pulled in. Consequently, inadequate polishing of the ferrule f is prevented, and offset of the center qt of the oblique convex spherical surface q with the optical axis point P of the optical fiber s is prevented. The result is that when oblique convex spherical surfaces q and q' are brought in face-to-face contact, the optical axes L and L' of the optical fibers s and s' coincide, and stabilization and minimization of insertion loss and light reflected back to the source can be effected.

Explanations of the above-mentioned setting jig are given by way of a specific example.

Figure 20:
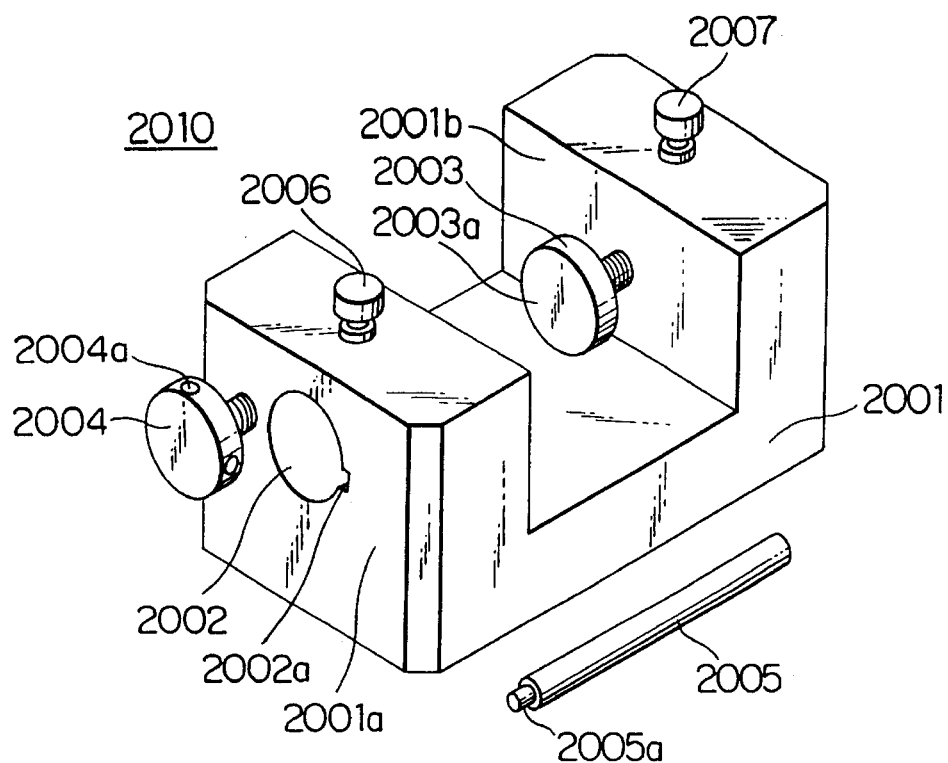
FIG. 20 is a perspective view showing the setting jig.

FIG. 20 is a perspective view showing the setting jig.

The setting jig 2010 comprises a base 2001, which is a C-shaped metallic block. The holder 2001a forms one side of the base 2001, provided with hole 2002 for inserting the collet chuck sleeve 100 shown in FIG. 3, and a lock screw 2006 for securing the collet chuck sleeve 100. The type of fit between the said hole 2002 and the collet chuck sleeve 100 is a high-level clearance fit complying with H8/f6 of the Japanese Industrial Standards. The outside wall surface surrounding the hole 2002 becomes the vertical reference plane for the collet chuck sleeve 100, therefore, the said surface is machined to a smoothness of 1.6 S of the Japanese Industrial Standards.

The other side of the base 2001 comprises the stopper 2001b, the stopper screw 2003 in contact with the tip of the ferrule f or optical fiber s shown in FIG. 3, and the lock screw 2007 for securing the stopper screw 2003. The surface 2003a in contact with the optical fiber s or tip of the ferrule f is machined to a smoothness of 1.6 s of the Japanese Industrial Standards. The threaded part of the stopper screw 2003 is provided with fine threads to reduce backlash to a minimum.

2004 is a clamp screw. This clamp screw 2004 pushes against the flange 113 of the optical connector positioning sleeve 110 shown in FIG. 3, and prevents the retreat of the said optical connector positioning sleeve 110. Clamp screw 2004 is provided with a turning rod hole 2004a. The tip 2005a of the turning rod 2005 is inserted in the turning rod hole 2004a and the clamp screw 2004 is rotated.

The method of usage of this setting jig 2010 is explained next.

Firstly, the collet chuck sleeve 100 is assembled (refer to FIG. 3 and FIG. 4). During this assembly, the collet tightening nut 130 is to be temporarily tightened with the protuberance of the ferrule f adjusted at the required value.

On the other hand, the stopper screw 2003 is rotated and the distance from the outside wall surface surrounding the hole 2002 of the holder 2001a to the contact surface 2003a of the stopper screw 2003 is adjusted to the required vertical reference value. After adjustment, the stopper screw 2003 is secured by using the lock screw 2007.

Next, the clamp screw 2004 is removed and the collet chuck sleeve 100 is inserted in the hole 2002, aligning the key slot 2002a of the hole 2002 and the key 152 (refer to FIG. 3) of the collet chuck sleeve 100.

Figure 21:
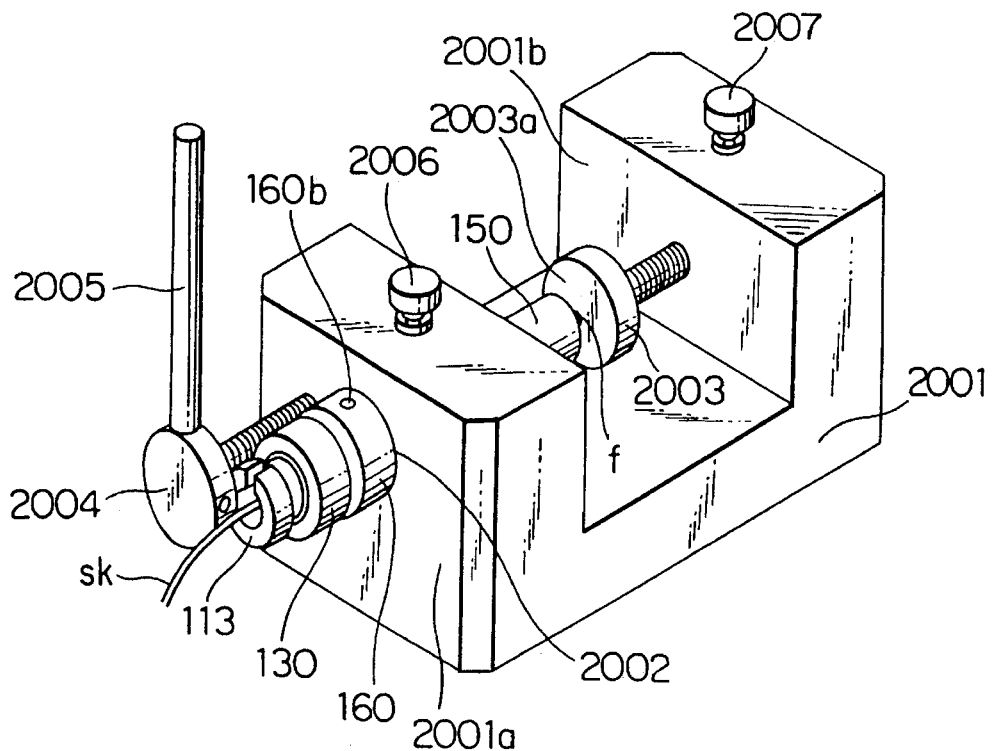
FIG. 21 is a perspective view of the setting jig shown in FIG. 20 after the collet chuck sleeve is inserted in it.
Figure 22:
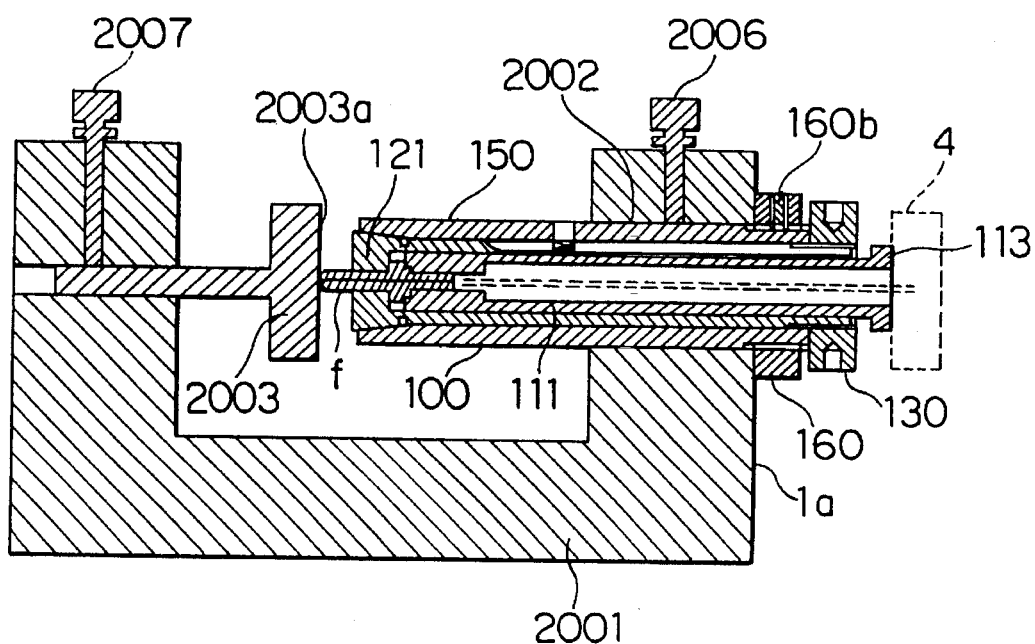
FIG. 22 is a cross section view of the setting jig shown in FIG. 20 after the collet chuck sleeve is inserted in it.

As shown in the perspective view of FIG. 21 and the cross section view of FIG. 22, the clamp screw 2004 is fitted, and screwed in lightly until it touches the flange 113 of the optical connector positioning sleeve 110. Furthermore, the clamp screw 2004 is screwed in loosely, the flange 118 of the optical connector positioning sleeve 110 pushed, and the tip of the ferrule f brought in contact with the contact surface 2003a of the stopper screw 2003.

Next, the turning rod 2005 is inserted in the turning rod hole 2004a of the clamp screw 2004, and tightened with appropriate force so that unnecessary clearance does not remain. In this condition, the collet chuck sleeve 100 is secured in position by the lock screw 2006 so that it does not move in the axial direction.

Next, the collet chuck sleeve height adjustment nut 160 is tightened with appropriate force so that it comes in close contact with the outside wall surface surrounding the hole 2002 of the holder 2001a. In this condition, the collet chuck sleeve vertical adjustment nut 160 is secured in position by the bolt 160b so that it does not rotate.

Next, the collet tightening nut 130 is screwed in firmly, the ferrule f is gripped by the collet 121, and the optical fiber assembly k is gripped firmly in the collet chuck sleeve 100.

Finally, the clamp screw 2004 is loosened and removed, the collet chuck sleeve 100 is withdrawn and from the hole 2002 and removed from the setting jig 2010.

In this way, using the setting jig 2010, the pull-in of the ferrule f when the collet tightening nut 130 is tightened firmly, can be avoided. Consequently, inadequate polishing of the ferrule f is prevented, and the center qt of the oblique convex spherical surface q is not offset from the optical axis point P of the optical fiber s. The result is that, when the oblique convex spherical surfaces q and qt are brought in face-to-face contact, the optical axes L and L' of the optical fibers s and s' coincide, and stabilization and minimization of insertion loss and light reflected back to the source can be effected.

Example of measurement

[Measurement method]

Using the setting jig 2010 mentioned above, the optical fiber assembly is set in the collet chuck sleeve 100. At this stage, a constant tightening force is maintained on the clamp screw 2004 and the collet tightening nut 130.

Figure 23:
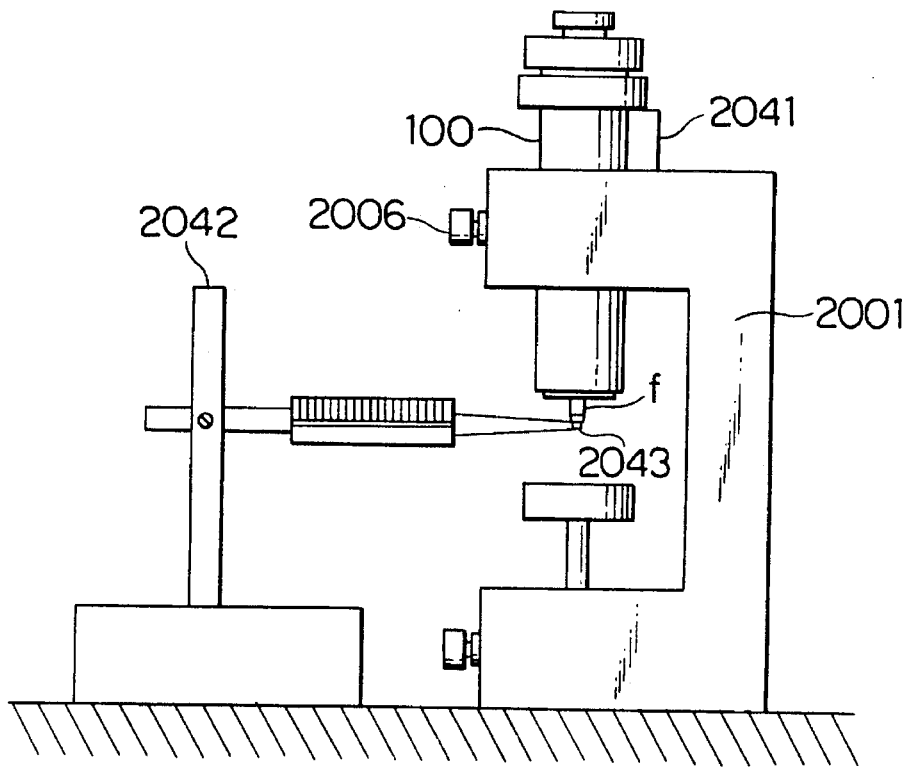
FIG. 23 is an explanatory drawing showing the measurement method of the pull-in distance.

Next, the setting jig 2010 is erected on the level block as shown in FIG. 23, lock screw 2006 is loosened, the collet chuck sleeve 100 is pulled up held in position using a spacer 2041 of the required height.

Next, a dial gauge 2042 with a 2/1000 mm scale is installed on the level block, the terminal of the dial gauge 2042 is brought into contact with the tip of the ferrule f, and the reading on the dial gauge is taken.

[Measurement results]

The results of analyzing measurement values obtained by 100 repetitive measurements showed that the average pull-in distance of the ferrule f was 0.006 mm, and the maximum value was 0.014 mm.

Comparison with the results of the comparative example given below, confirmed that the distance the ferrule f was pulled in, had reduced significantly.

Comparative example

[Measurement method]

The optical fiber assembly was set in the collet chuck sleeve 100 without using the setting jig 2010. The collet chuck sleeve was maintained at a fixed position, and the position of the tip of the ferrule f was measured using a height gauge.

[Measurement results]

The results of analyzing measurement values obtained by 100 repetitive measurements showed that the average pull-in distance of the ferrule f was 0.2 mm.

According to the method for manufacturing optical fiber assembly with polished end face and the apparatus for polishing the end face described in this invention, at least the tip of the ferrule of the fiber-ferrule assembly is polished to a conical surface, which is thereafter polished to a spherical surface, therefore, during the spherical surface polishing process, the polishing of the top of the conical surface proceeds faster from both edges of the conical surface, and gives a satisfactory balance, enabling a satisfactory, oblique convex spherical surface to be formed. Therefore, there is no offset between the optical axis point of the optical fiber and the center of the oblique convex spherical surface, thereby the insertion loss and the light reflected back to the source can be stabilized and minimized.

According to the method for checking the end point of end-face polishing process of the optical fiber and the apparatus for polishing end faces having functions for implementing the said method described in this invention, the polishing of the oblique conical surface can be carried out while practically checking the coincidence of the top of the conical surface and the optical axis point of the fiber.

What is claimed is

1. A method for manufacturing an optical fiber assembly with a polished end face, comprising the steps of:

first polishing said optical fiber assembly including an optical fiber and a ferrule to form a conical surface at the end face such that:

a central axis of said conical surface makes an inclination of θ° with respect to an optical axis of said optical fiber, and a top of said conical surface coincides with the optical axis of said optical fiber, and has a taper angle of α°, and further polishing said optical fiber assembly to form a convex spherical surface at the end face such that a central axis of said convex spherical surface makes an inclination of θ° with respect to the optical axis of said optical fiber.

2. A method for manufacturing an optical fiber assembly with a polished end face, comprising the steps of:

first polishing a ferrule having an insertion hole to form a conical surface at the end face such that:

a central axis of said conical surface makes an inclination of θ° with respect to an axis of said insertion hole, and a top of said conical surface coincides with the axis of said insertion hole, and has a taper angle of α°, then inserting an optical fiber into said insertion hole of the ferrule to form an optical fiber assembly, then further polishing said optical fiber assembly to form a convex spherical surface at the end face such that a central axis of said convex spherical surface makes an inclination of θ° with respect to the optical axis of said optical fiber.

3. The method for manufacturing an optical fiber assembly with polished end face according to claim 1 or claim 2, wherein; said angle α° is at least 1.5° and not more than 3°.

4. The method according to claim 1, further comprising the step of shaking the optical fiber assembly during at least one of said first and further polishing steps to relocate a polishing point at the end face thereat so as to prevent localized wear of the end face at the polishing point.

5. The method according to claim 4, wherein said step of shaking occurs in a horizontal plane.

6. The method according to claim 4, wherein said step of shaking occurs in a vertical plane.

7. The method for manufacturing an optical fiber assembly with polished end face according to claim 1 or claim 2, wherein; said inclination θ° is at least 8° and not more than 12°.

8. The method according to claim 2, further comprising the step of shaking at least one of the ferrule and the optical fiber assembly during at least one of said first and further polishing steps to relocate a polishing point at the end face thereat so as to prevent localized wear of the end face at the polishing point.

9. The method according to claim 8, wherein said step of shaking occurs in a horizontal plane.

10. The method according to claim 8, wherein said step of shaking occurs in a vertical plane.

11. A method for examining an end point of an end-face polishing process of an optical fiber, comprising the steps of:

passing a laser beam through a non-polishing end of the optical fiber while an optical fiber assembly including an optical fiber and a ferrule is being polished to form a conical surface at the end face such that a central axis of said conical surface makes an inclination of θ° with respect to an optical axis of said optical fiber, and a top of said conical surface coincides with the optical axis of said optical fiber, and has a taper angle of α°, and examining a coincidence of the top of said conical surface with the optical axis of said optical fiber by detecting, at said non-polishing end, any change in light reflected at the polishing end of the optical fiber.

\* \* \* \* \*